Nov. 4, 1941.  J. S. STULL  2,261,783
WELD TESTING APPARATUS
Filed March 29, 1939
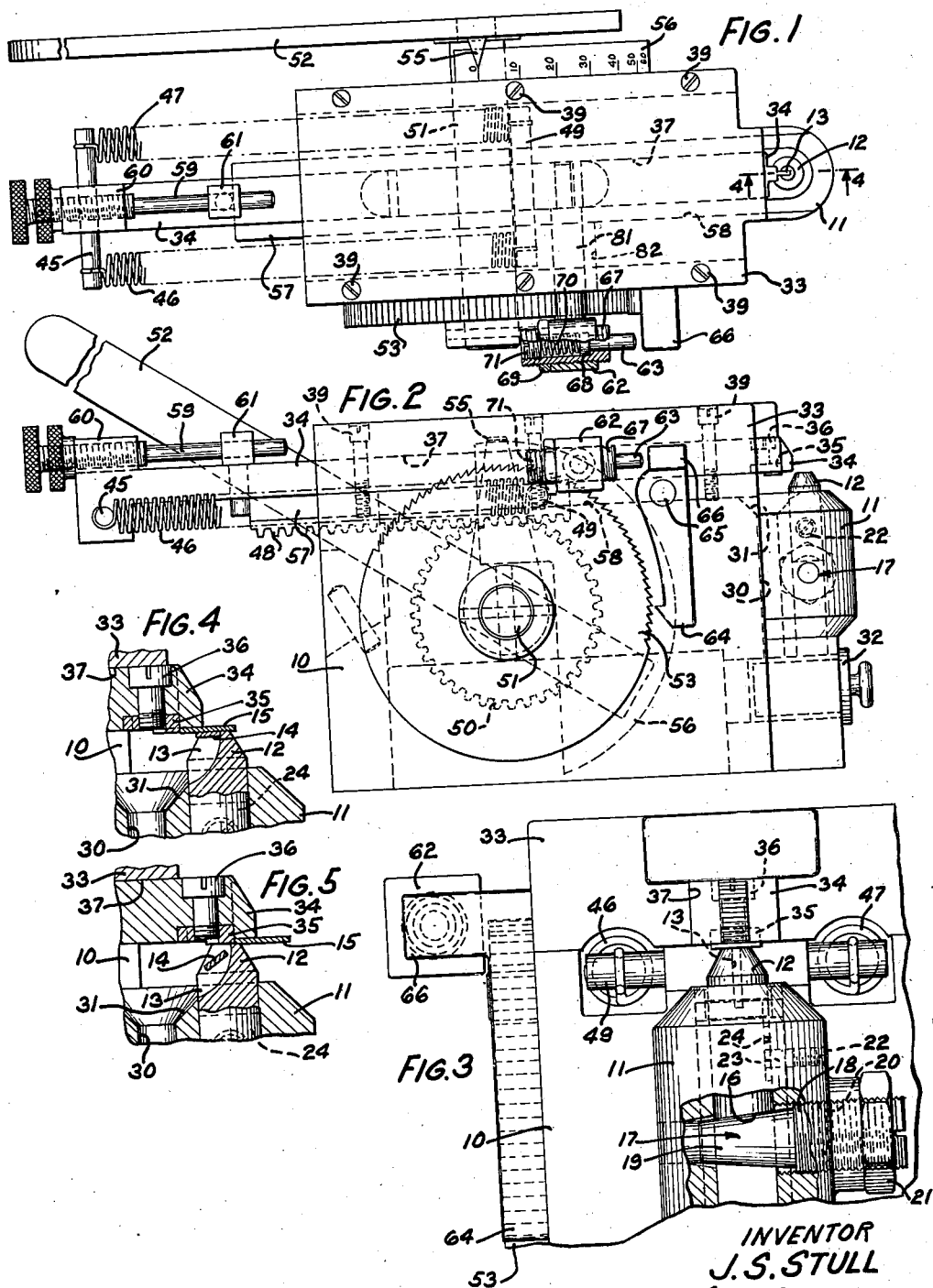
INVENTOR
J. S. STULL
BY Emery Robinson
ATTORNEY Patented Nov. 4, 1941

2,261,783

UNITED STATES PATENT OFFICE 2,261,783

WELD TESTING APPARATUS

John S. Stull, Chicago, Ill., assignor to Western Electric Company, Incorporated, New York, N. Y., a corporation of New York Application March 29, 1939, Serial No. 264,724

6 Claims. (Cl. 265—12)

This invention relates to weld testing apparatus and particularly to apparatus for determining the quality of the welding of contact points to contact springs of electrical equipment.

In relay contact springs of electrical equipment, it is common to weld a contact point to a supporting contact spring of different metal. The contact point must be rigidly secured to the contact spring to form a proper mechanical and electrical connection, and it is desirable to test a predetermined number of the welds to destruction in order to determine that the contact points are being properly made.

An object of the present invention is to provide a simple and efficient testing apparatus for testing the quality of articles.

In attaining this object, an apparatus for testing the bond between a contact point and a contact spring is provided, which comprises a stationary anvil, against an edge of which the contact point may be placed, and in that position the contact spring is adapted to be engaged by a shear bar, connected by a spring having a predetermined tension, to an actuating rack driven by a pinion fixed to a shaft, on which there are mounted an actuating lever, a pointer, and a ratchet. The ratchet has cooperating therewith a pawl, which is normally disengaged from the ratchet, and which will be moved into engagement with the ratchet upon a slight displacement between the shear bar and the anvil, whereby, when a contact is sheared from the contact spring by the cooperating anvil and shear bar, the amount that the spring has been stretched before the contact is parted from the contact spring will be indicated by the position of the pointer, and further rotation of the pointer and ratchet supporting shaft will be prevented by the pawl.

Other objects and advantages of the invention will be understood by referring to the following specification and accompanying drawing, in which Fig. 1 is a plan view of a testing fixture for testing the strength of contact point welds and embodying the features of the invention;

Fig. 2 is a side elevational view of the apparatus shown in Fig. 1;

Fig. 3 is an end elevational view of the same structure;

Fig. 4 is an enlarged fragmentary vertical sectional view, taken on the line 4—4 of Fig. 1 in the direction of the arrows, showing the contact spring and contact in position between the shear bar and the anvil before the contact is sheared from the contact spring;

Fig. 5 is an enlarged fragmentary sectional view, also taken on the line 4—4 of Fig. 1 in the direction of the arrows, showing the same parts of the apparatus as shown in Fig. 4 just after the shear bar has sheared a contact from the contact spring.

Referring to the drawing, wherein like reference characters designate the same parts throughout the several views, the numeral 10 designates generally a base member in the form of a casting on which the various parts of the apparatus are mounted. The right end (Figs. 1 and 2) of the base member 10 has a projecting portion 11 in which an anvil 12 is mounted, and the anvil 12 has a rounded slot 13 formed therein (Figs. 4 and 5) in which a relatively long, narrow contact 14, mounted on a contact spring 15, will nest. Contact springs and contacts of the general type, which the present invention is designed to test, are shown in the patent to A. H. Adams, No. 1,907,930. The anvil is provided with an angularly disposed lower surface, as shown at 16 (Fig. 3), which cooperates with an adjusting screw 17 having a threaded portion 18 and a tapered portion 19 whereby the height of the anvil 12 may be adjusted with a high degree of accuracy to adapt it for cooperation with contact springs 15 of different thickness. The adjusting screw 17 is threaded in an aperture 20 in the projection 11 and may be locked in place by means of a lock nut 21. After the height of the anvil 12 has been properly adjusted, and before the lock nut 21 is tightened on the adjusting screw 17, a set screw 22 may be set to force a plunger 23 into engagement with a flattened portion 24 on the anvil, thereby to insure that the slot 13 in the anvil is in the proper position to receive contacts 14 within it.

Also formed in the projection 11 is a passageway 30, having a funnel-shaped opening 31 at its upper end and extending downwardly to a drawer 32, whereby any of the contact points, which are usually made of precious metal and are sheared off of the contact springs, will be directed through the passage 30 to the drawer 32.

Cooperating with the anvil 12, and slidable between the base member 10 and a top plate 33, is a shear bar 34, in which a shearing member 35 is fixed by means of a machine screw 36. The shear bar 34 extends outwardly to the left of the casing (Figs. 1 and 2), being slidable in a guideway 37 formed in the top plate 33, which is fixed to the base 10 by screws 39—39. A pair of springs 46 and 47 are connected to the outer ends of a pin 45, mounted in the left end (Figs. 1 and 2) of the shear bar 34 and to a pin 49 which extends through a rack 48. Meshing with the rack 48 is a gear 50 fixed to a shaft 51, on which there is also fixed an actuating lever 52 and a ratchet 53. The end of the shaft 51, to which the actuating lever 52 is secured, carries a pointer 55, which cooperates with a scale 56 mounted on the side of the base 10.

The rack 48 is formed integrally with a rack bar 57, which is slidable in a guideway 58 formed in the base 10, and will be moved to the right (Figs. 1 and 2) when the actuating lever 52 is rotated in a clockwise direction (Fig. 2) and will tend to draw the shear bar 34 with it since it is tied to the shear bar by the springs 46 and 47.

The shear bar 34 carries an adjustable stop member 59 threaded in a projection 60 and guided by a guide pin 61 mounted in the shear bar. The guide pin 61 extends down through the shear bar and abuts the left end (Fig. 2) of the rack bar 57 to prevent the rack bar from moving too far to the left when the springs 46 and 47 draw it in that direction. The stop member 59 will prevent the shear bar from moving too far to the right since it will abut the left end of the top plate 33 (Fig. 2) when the shear bar tends to move to the right after shearing a contact from a contact spring. The amount of movement of the shear bar may be adjusted by adjusting the position of the stop member, which is threaded into the projection 60.

Mounted upon the shear bar, and extending out beyond the top plate 33, is a post 81, which has an enlarged head 62 for supporting a pawl actuating pin 63 and which is movable in a slot 82 in the top plate 33. Cooperating with the pawl actuating pin 63 is a pawl 64 pivotally mounted on the base 10 at 65. The pawl is so shaped that it normally remains in the position shown due to the mass of its weight being equally distributed about the pivot pin 65 and the pawl has a portion 66 thereof which extends into the path of the pawl actuating pin 63. The head 62 of the post 81 has threaded therein a pin supporting member 67, which has an internal shoulder at 68 for engagement by the head of the pin 63, and which may be locked in place in the head 62 by a lock nut 69. Positioned within the pin supporting member 67 is a coil spring 70, one end of which abuts against the head of the pin 63, and the other end of which engages a screw 71, whereby the spring 70 normally tends to hold the head of the pin 63 against the internal shoulder 68.

With the actuating lever 52 in the position shown, a contact spring 15, having a contact 14 welded thereto, may be placed on the anvil 12 with the contact 14 in the slot 13 in the anvil and the lever 52 may then be moved in a clockwise direction to rotate the shaft 51 in a clockwise direction, thereby to move the rack 48 to the right. As the rack 48 moves to the right, the springs 46 and 47 will tend to draw the shear bar 34 with the rack 48. However, the shearing member 35 will be engaged with the edge of the contact spring 15, as shown in Fig. 4, and therefore the shear bar 34 will be prevented from moving to the right until the welded joint breaks, and until the welded joint breaks, the rack bar 57 will move to the right and will store energy in the springs. The amount of energy stored in the springs may be determined by reading the position of the pointer 55 with respect to the scale 56, which is graduated in pounds. As soon as the contact 14 is sheared from the contact spring 15, the shear bar 34 will snap to the right, and in so doing, will carry the post 81 with it, whereby the pawl actuating pin 63 will strike the pawl 64 and cause it to engage the ratchet 53 to stop further movement of the rack 48 to the right. Since the pawl will be snapped into engagement with the ratchet quite rapidly upon the shearing of the contact from the contact spring, the amount of pressure required to shear the contact from its associated spring will be indicated by the position of the pointer 55 with respect to the scale 56. As the shear bar 34 is snapped to the right, the stop member 59 will strike the top plate 33 and after the position of the pointer 55 has been read, the actuating lever 52 may be moved in a counterclockwise direction to move the rack bar 57 to the left. As the rack bar 57 moves to the left, it will engage the pin 61 and move the shear bar 34 to the left to prepare the fixture to receive another contact spring.

Although a specific embodiment of the invention has been shown and described hereinbefore, it will be understood that many modifications thereof may be made without departing from the invention, which is to be limited only by the scope of the appended claims.

What is claimed is:

1. In a fixture for testing the strength of welds, a stationary anvil for engaging one of two parts welded together, a shear bar for applying pressure to another of said parts, means for applying pressure to said shear bar including a resilient bar actuating member, means for stopping said last mentioned means when the parts are sheared one from another, and means carried by the shear bar for actuating the stopping means.

2. In an apparatus for testing the strength of welded joints, a stationary anvil for engaging one of two welded together parts, a shear bar for engaging another of said parts, resilient means for forcing the shear bar against the part associated with it, means for actuating said resilient means, an indicator for indicating the amount of pressure exerted by said resilient means on the shear bar, and means for preventing further operation of the indicating means when the parts are sheared one from another.

3. In a fixture for testing the strength of a weld between two parts, a stationary anvil for engaging one of the parts, a shear bar for engaging the other of said parts, an actuating rack resilient means interconnecting the rack and the shear bar, means for stopping movement of said rack, and means connected to the shear bar for rendering said stopping means effective when the welded parts are sheared one from another.

4. In a testing fixture for welded joints, a stationary anvil, a shear bar associated with said anvil to apply shearing pressure to said joint, a rack for supplying power to said shear bar, resilient means interconnecting the rack and shear bar, means for indicating the amount of movement of the rack, a ratchet associated with said last mentioned means, and a pawl for stopping said ratchet when the shear bar shears a weld.

5. In a testing fixture for welded joints, an actuating lever, a shaft oscillatable by said lever, a pointer carried by said shaft to indicate the amount of rotation thereof, a gear mounted on said shaft, a rack bar driven by said gear, a pair of springs each having one end connected to said rack bar, a shear bar connected to the other ends of said springs for applying pressure to one of two parts connected together by a welded joint, means for holding the other of said parts stationary, a pin carried by said shear bar, a pawl mounted in the path of said pin for actuation thereby, and a ratchet mounted on the shaft in position to be engaged by said pawl when the shear bar moves beyond a predetermined point.

6. In a testing fixture for welded joints, an actuating lever, a shaft oscillatable by said lever, a pointer carried by said shaft to indicate the amount of rotation thereof, a shear bar resiliently interconnected to said shaft to be actuated thereby for applying pressure to one of two parts connected together by a welded joint, means for holding the other of said parts stationary, a pin carried by said shear bar, a pawl mounted in the path of said pin for actuation thereby, and a ratchet mounted on the shaft in position to be engaged by said pawl when the shear bar moves beyond a predetermined point.

JOHN S. STULL.